July 28, 1925.
G. KLOEHN
MILK STRAINER
Filed Aug. 7, 1924
1,547,761
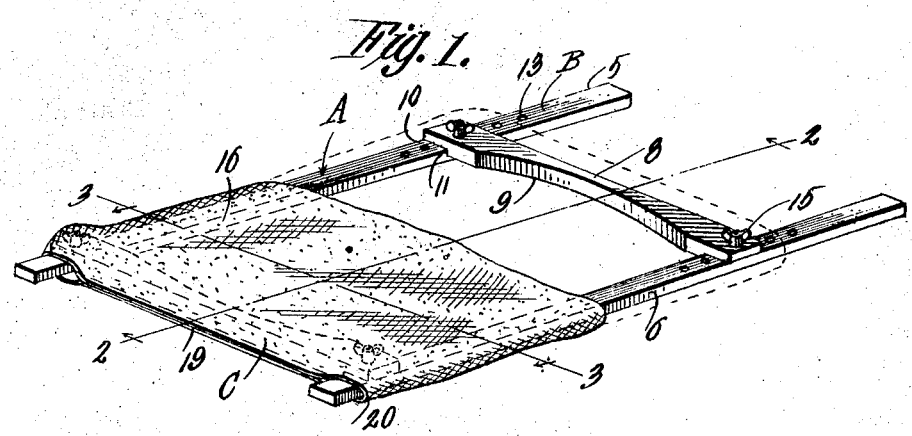
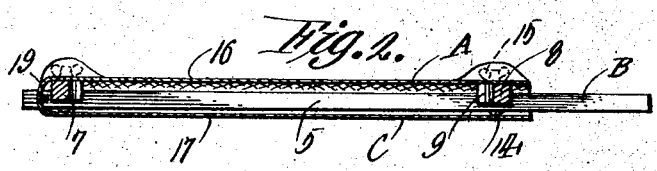
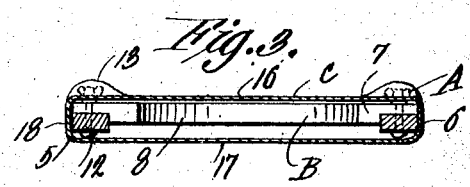
WITNESSES
GUSTAVE KLOEHN Inventor
By Richard B. Owen Attorney Patented July 28, 1925.

1,547,761

UNITED STATES PATENT OFFICE.

GUSTAVE KLOEHN, OF GARFIELD, MINNESOTA.

MILK STRAINER.

Application filed August 7, 1924. Serial No. 730,702.

*To all whom it may concern:*

Be it known that I, GUSTAVE KLOEHN, a citizen of the United States, residing at Garfield, in the county of Douglas and State of Minnesota, have invented certain new and useful Improvements in Milk Strainers, of which the following is a specification.

This invention appertains to a novel milk strainer and more particularly to a milk strainer for the bowls of cream separators and the like.

The primary object of the present invention is to provide a milk strainer for cream separators comprising a frame for resting upon the bowl of the cream separator and a novel straining cloth removably carried by the frame.

A further object of the invention is to provide a novel frame which can be readily adjusted to the desired size of the bowl of the cream separator.

A still further object of the invention is to provide a milk strainer of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated, in the accompanying drawings, in which drawings:

Figure 1 is a perspective view of the improved milk strainer showing a part of the straining cloth broken away, Figure 2 is a central longitudinal section through the improved milk strainer taken on the line 2—2 of Figure 1 looking in the direction of the arrows, and Figure 3 is a transverse section through the milk strainer taken on the line 3—3 of Figure 1 looking in the direction of the arrows.

Referring to the drawings in detail, wherein similar reference characters designate corresponding parts throughout the several views, the letter A generally indicates the improved milk strainer, which comprises the frame B and straining cloth C.

The frame B is of novel construction and is preferably formed of light material such as wood or the like and comprises a pair of spaced parallel longitudinally extending side bars 5 and 6 and transversely extending end bars 7 and 8. The end bars 7 and 8 are provided with arcuate inner faces 9 in order to conform to the configuration of the bowl of the cream separator and the terminals of the bars 7 and 8 have their terminals at the lower faces thereof provided with notches 10 for resting on the upper faces of the side bars 5 and 6. These notches 10 formed in the lower faces of the end bars 7 and 8 at the terminals thereof define transverse shoulders 11 for engaging the inner edges of the side bars 5 and 6 in order to prevent relative inward movement of the said side bars toward one another.

In order to permit the adjustment of the frame to the size of the bowl of the separator I prefer to provide means for permitting the adjusting of the end bar 8 toward the end bar 7. The end bar 7 is preferably rigidly secured in place by suitable bolts 12 which extend through registering openings in the side bars 5 and 6 and the terminals of the end bar 7. Any preferred type of nut such as winged nuts 13 can be threaded on the threaded end of the bolts and to engage with the upper face of the said end bar 7.

In order to permit the adjustment of the end bar 8, the side bars 5 and 6 are provided with a plurality of equa-distantly spaced openings 13 and the terminals of the end bar 8 are provided with openings which are adapted to register with any one of the openings 13. The registering openings are adapted to receive suitable retaining bolts 14 the threaded terminals of which receive winged nuts 15 for impinging against the upper face of the said end bar 8. By this construction it is obvious that the said end bar 8 can be moved toward and away from the end bar 7.

The straining cloth C is also of a novel form and the same is in the nature of a bag including parallel walls 16 and 17, side walls 18, and a bottom wall 19. The bottom wall 19 is provided with openings 20 for a purpose, which will hereinafter more fully appear.

The frame B is adapted to be slipped into the straining cloth C between the walls 16 and 17 thereof and these walls are of course held in spaced relation by the frame thus forming an upper and lower ply of straining material. As clearly shown in Figure 1 of the drawings the adjacent terminals of the side bars 5 and 6 extend through the openings 20 in the straining cloth C when the same is placed on the frame.

It is obvious from the foregoing that when the straining cloth C becomes soiled the same can be easily removed from the frame and washed.

Changes in details may be made without departing from the spirit or the scope of this invention, but:

What I claim as new is:

1. In a milk strainer for cream separators, a frame comprising a pair of spaced parallel side bars and a pair of spaced parallel end bars, the inner edges of the end bars being arcuated to conform to the configuration of the bowl in the cream separator, the lower faces of the end bars of the terminals thereof being provided with notches to receive the said side bars, means for rigidly securing one of the end bars to the side bars, the side bars having a plurality of spaced openings therein, the terminals of the other end bar being provided with openings arranged to register with any of the openings in the side bars, and removable fastening elements fitted through the said registering openings and a bag of straining material for receiving said frame.

2. A milk strainer for cream separators comprising an open frame arranged in a horizontal plane including longitudinally extending side bars and spaced parallel connecting bars, means for detachably and rigidly securing one of the end bars in place, and means for adjustably securing the other end bar in place on the side bars whereby the same can be moved toward and away from the other end bar, and a bag of straining material including upper and lower walls receiving the frame, the frame forming means for holding the upper and lower walls in spaced relation to form a pair of spaced plies of straining material.

In testimony whereof I affix my signature in the presence of two witnesses.

GUSTAVE KLOEHN.

Witnesses:
 GEO. ROCHE,
 DAN E. JACOBSON.